United States Patent

[11] 3,633,280

[72] Inventor Henry P. Lichte, Jr.
Houston, Tex.
[21] Appl. No. 889,205
[22] Filed Dec. 30, 1969
[45] Patented Jan. 11, 1972
[73] Assignee Sperry Sun Well Surveying Company
Sugar Land, Tex.

[54] METHOD AND APPARATUS FOR DETERMINING THE ORIENTATION OF A BOREHOLE
3 Claims, 3 Drawing Figs.

[52] U.S. Cl. .................................................... 33/205, 33/74
[51] Int. Cl. ...................................................... E21b 47/02
[50] Field of Search .......................................... 33/74 R, 74 B, 69, 205

[56] References Cited
UNITED STATES PATENTS

| | | | |
|---|---|---|---|
| 341,690 | 5/1886 | Reichenbach | 33/74 B |
| 1,770,224 | 7/1930 | Anderson | 33/204 |
| 1,830,345 | 11/1931 | Anderson | 33/72 R |
| 2,818,652 | 1/1958 | Baker | 33/69 |
| 3,229,375 | 1/1966 | Crake | 33/205 |

OTHER REFERENCES

Brunson Instr. Co., 1953, Catalogue No. 50, 1405 Walnut St., Kansas City 6, Mo.

Primary Examiner—Leonard Forman
Assistant Examiner—Paul G. Foldes
Attorneys—George L. Church, Donald R. Johnson, Wilmer E. McCorquodale, Jr. and John E. Holder ABSTRACT: The particular embodiment described herein as illustrative of one form of the invention utilizes an instrument for measuring azimuthal direction between a rod extending into a borehole and a reference marker having a known position. The angle of inclination between the rod and a horizontal reference is also measured. The instrument is then rotated 180° and measurements again made, which measurements are averaged with the first readings to give an error-free indication of borehole orientation.

PATENTED JAN 11 1972 3,633,280

INVENTOR
HENRY P. LICHTE, JR.

John E. Holder

ATTORNEY

METHOD AND APPARATUS FOR DETERMINING THE ORIENTATION OF A BOREHOLE

BACKGROUND OF THE INVENTION

This invention relates to a method and apparatus for determining the orientation of a borehole, and more particularly to a system for measuring the azimuthal direction and inclination of a relatively short upper section of borehole which extends into the earth.

In many situations it is desirable to know the direction and dip of a borehole drilled in the earth's surface. For example, in the planning for excavation of an ore pit, core holes are drilled to determine the peripheral boundaries of the pit, and the depth at which various materials will be found therein. The direction and dip of such holes is important in determining just where such materials are located. Since millions of dollars may be spent in removing vast amounts of overburden to get to a small amount of mineral, an accurate determination of such mineral's location is important in planning for such excavation. Other situations which require information as to the direction and dip of boreholes, for example, are construction holes used sometimes in the foundations of large buildings or other such structures, holes drilled in the earth to intersect caverns, or any similar type of hole which is directional in nature or where the direction and inclination is important.

One of the most common uses of this invention is with respect to the drilling of slanthole oil wells from a drilling platform. Currently many wells are being drilled offshore from platforms which are utilized to drill a number of wells from the single platform. Such wells are normally drilled at angles from the platform in order to penetrate one or more reservoirs at a plurality of points spaced from the drilling platform. A recent technique in this regard is the use of a slant rig wherein the rig itself is mounted upon a table which is angularly situated on the drilling platform so that a line perpendicular to the slanted table will penetrate the earth at radial angles as the table is rotated. Such a slant rig is described in U.S. Pat. No. 3,443,647, issued May 13, 1969, and assigned to Lee C. Moore Corporation. When the slanted table is rotated, such angular lines representing boreholes being drilled, will radiate outwardly from the drilling platform. When drilling a slant hole from such a rig, although you may start in some initial direction, the hole may deviate to another direction due to the flexible nature of drill pipe used in drilling such holes, and therefore, it is necessary to determine the initial angular direction of the hole as it penetrates into the earth. In the past, transits or other such surface-surveying instruments have been used to determine the direction of the hole; however, all that is seen by such instruments is the top of the hole and drilling pipe and tools are so flexible that they may make the hole in almost any direction independent of the orientation of pipe directly at the surface. Due to the use of conductor pipe in such holes, magnetic instruments are not practical because of the presence of magnetic material in the wellbore and gyroscope surveys are time consuming and expensive. The technique of the present invention gives a quick and inexpensive method for determining such hole direction.

It is therefore an object of the present invention to provide a new and improved method and apparatus for determining the orientation of a borehole near the surface thereof.

SUMMARY OF THE INVENTION

With this and other objects in view, the present invention includes an apparatus having an elongated member for insertion into the wellbore and a plane surface attached thereto which is sighted in a known direction and having means for measuring the angle between such sighted and known direction and the elongated member which is inserted into the wellbore. In addition, means are provided for determining the angle of inclination between the plane surface, which is leveled with respect to the earth's surface, and the elongated member in the wellbore. By making such angular determinations again after rotating the apparatus 180° in the wellbore and averaging the two sets of readings, errors inherent in such a system are eliminated.

A complete understanding of this invention may be had by reference to the following detailed description, when read in conjunction with the accompanying drawings illustrating embodiments thereof.

DESCRIPTION OF THE PREFERRED EMBODIMENTS

Figure 1:
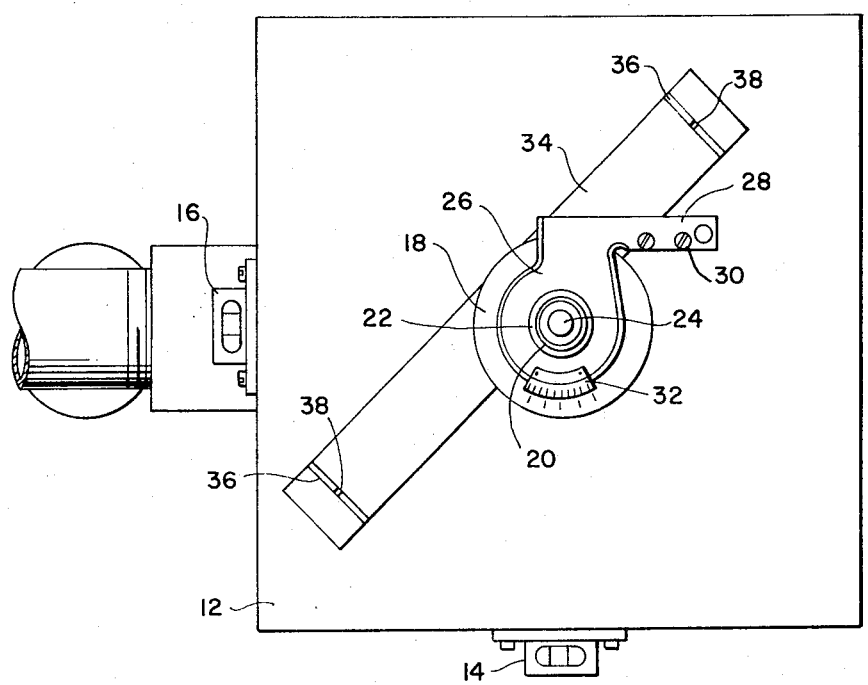
FIG. 1 is a plan view of an instrument for determining the orientation of a borehole in accordance with the present invention.

Referring first to FIG. 1 of the drawings, an apparatus for practicing the invention includes a rectangular plane surface or baseplate 12 having bubble-type leveling devices 14 and 16 mounted upon adjacent edges thereof to provide a means for leveling the baseplate with respect to the earth's surface. A protractor 18 is rotatably mounted on the upper surface of the baseplate and has a turning knob 20 connected to the rotatably mounted protractor for turning the protractor relative to the surface of the baseplate. A second knob 22 which is mounted on the protractor has a gear reduction mechanism (not shown) between the knob and the protractor which provides a method for slowly turning the protractor and making small adjustments in its position relative to the baseplate. The turning knob also has a locking mechanism 24 which permits locking of the protractor against rotative movement relative to the baseplate. plate. The mechanism of the protractor may be similar to that used in a STARRETT No. C 359C Universal Bevel Protractor. A stationary portion 26 is also provided on the protractor, and has an outwardly extending arm portion 28 including attaching means such as screws 30 for mounting the protractor on the baseplate. The stationary portion 26 has a vernier scale 32 mounted thereon which is arranged to be positioned adjacent the directional protractor so as to cooperate functionally with the scale on the protractor when the protractor scale is rotated.

Figure 2:
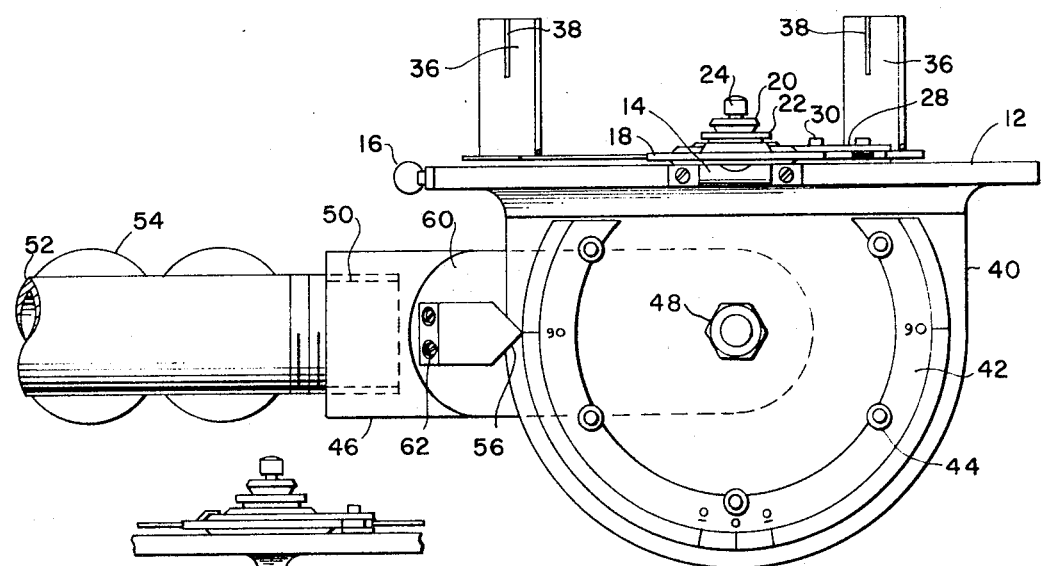
FIG. 2 is a side view of the apparatus of FIG. 1 partially in section.

A sighting base 34 is attached to the rotatable protractor 18 and rotates with the protractor. An alidade or sighting device is mounted on the sighting base and may take the form as shown in FIG. 2 of a pair of upright plates 36 having slits 38 therein which are alignable to form a sight in the direction of the longitudinal axis of the sighting base. Other sighting devices such as a telescope may be used in place of the sighting device shown.

An alternative arrangement may be provided by marking or otherwise providing a protractor scale directly on the base wherein the alidade may be merely a rotatable arm having a sighting means and a pointer which cooperates with the protractor when rotated over the base.

Referring next to FIG. 2, a vertical plate 40 extends downwardly from the bottom of the baseplate, and is provided with a protractor scale 42 which is mounted thereon by means of screws or the like 44. A rod holding extends radially outwardly from the center of vertical plate 40 and is rotatably mounted on the vertical plate by means of a bolt 48 forming an axle. The rod-holding device has a threaded interior bore portion 50 at its opposite end. An elongated rod member 52 has an end portion which is threadably received within the bore portion 50. The rod 52 may be 20- to 30-feet long. Centralizers, spacers, or the like 54 are mounted on the rod member. A pointer 56 is mounted on the rod holder and is arranged so that as the rod holder 46 and rod 52 are rotated about the axle 48, the pointer 56 is cooperatively positioned adjacent the protractor scale 42 mounted upon the vertical base. As shown in FIG. 2 the pointer 56 is opposite a 90° reference mark on the protractor 42 indicating that the rod 56 is parallel with baseplate 12. If the rod holder is rotated relative to base plate 12 and pointed downwardly, perpendicular to baseplate 12, the pointer 56 will be aligned with the zero reference mark on the protractor 42.

Figure 3:
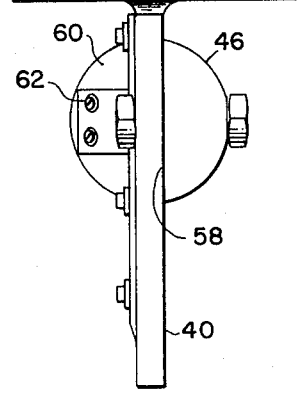
FIG. 3 is a partial end view of the apparatus of FIGS. 1 and 2.

FIG. 3 shows additional detail of how the rod holder 46 is mounted on the vertical plate 40. The end of the rod holder which is attached to the plate 40 has a milled flat portion 58 thereon, which is positioned adjacent to the plate 40 and forms a bearing surface therewith. The pointer 56 is mounted upon a vertical end wall 60 of the rod holder, attached thereto by means of screws 62.

In the operation of the apparatus described above, when it is desired to determine the direction orientation of the upper portion of a borehole, the elongated rod 52 extending outwardly from the rod holder 46 is inserted into the borehole with the centralizers 54 providing a means for centrally locating the rod within the borehole. Normally pipe or casing would be in the borehole to provide a smooth surface for permitting centralization by means of the centralizers 54 to give an accurate axial positioning of the rod within the borehole.

When the apparatus is used in determining the orientation of an oil well borehole, it is normally preferable to run the apparatus in conductor pipe as opposed to drill pipe because of the tortuous nature of drill pipe when it is extended into a wellbore. The elongated rod which extends downwardly into the borehole as much as 20 or 30 feet helps to maintain a true directional reading and cancel out some of the effects of the tortuous nature of a borehole extending into the earth. After the rod 52 has been inserted as fully as possible into the borehole, the baseplate 12 of the apparatus is leveled by means of the bubble levels on the sides of the base. Since the bubbles are arranged on adjacent sides of the plate, the plate may be leveled in a true horizontal position relative to the earth's surface.

After the above-described leveling of the baseplate, an object which is positioned in a known direction from the borehole is sighted through the alidade mounted on the baseplate. Such object may be in the form of a stake or the like which is positioned some distance away from the borehole, or in the case of an offshore location, may be an object on shore at a distance, or another platform located at a distant space from the borehole being surveyed. In any event, after sighting the object which is positioned in a known direction from the borehole, a reading is made on the directional protractor 18 using the vernier scale to make an accurate determination of the angular or azimuthal position of the rod 52 relative to the known reference being sighted upon. The protractor is mounted on the baseplate to provide a direct reading of the angle between the alidade and the longitudinal rod 52 extending from the baseplate into the wellbore. While in this initial sighting position, a reading is also made of the inclination protractor 42 which is mounted on the vertical baseplate 40 extending downwardly from the horizontal baseplate. This reading is made by observing the number on the protractor 42 opposite the pointer 56 on the rod holder 46.

This latter reading is a measure of the angle between the a longitudinal axis of the elongated rod 52 and a vertical line perpendicular to the baseplate 12. These two angular readings from protractors 18 and 42, respectively, provide a measurement of the azimuthal direction in which the elongated rod is pointing relative to a object in a known direction and the angle of rod 52 and thus the wellbore with respect to the horizontal.

Assuming now that the wellbore into which the rod 52 is projecting is in a near vertical orientation, this normally being the situation, the rod 52 and baseplate 12 are rotated 180° where again the steps outlined above such as leveling and sighting are repeated and both the azimuthal direction angle and angle of inclination are recorded. The reason for the second set of readings is that if the centralizers 54 are crooked on the rod 52 to misalign the rod or for some other reason the rod 52 is not centered in the well pipe, the error or false reading resulting from the initial survey will be cancelled by an error in the opposite direction when the apparatus is rotated. These second readings are then averaged with the first readings to provide an accurate determination of true azimuthal direction and angular inclination of the borehole.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A method of determining the direction of the upper portion of a borehole including the steps of: locating a reference marked in a known direction from the upper end of the borehole; inserting a portion of an elongated member into the borehole substantially in alignment with the longitudinal axis of the borehole, such member having a plane surface attached to the portion protruding from the borehole; leveling the plane surface relative to the horizontal; aligning a sighting device on the plane surface with the reference marker; determining the azimuthal direction of the borehole by measuring the angle between the sighting device point in known direction and the elongated member pointing in the direction of the borehole, and determining the inclination of the borehole by measuring the angle between the horizontal plane surface and the elongated member pointing in the direction of the borehole.

2. The method of claim 1 and further including the steps of rotating the sighting device 180° and aligning the sighting device with the reference marker, repeating the steps of measuring the azimuthal direction and inclination of the borehole; and averaging the two sets of readings of azimuthal direction and inclination to eliminate error in the measurements.

3. A method of determining the azimuthal direction and inclination of a borehole comprising the steps of: locating a reference marker in a known direction from the center of the borehole; inserting an elongated member into the borehole and extending along the longitudinal axis of the borehole, such member having an adjustable plane surface mounted on one end of the member extending from the borehole; leveling the plane surface along perpendicular axes running through the plane surface; aligning a sighting device on the plane surface with the reference marker; determining the azimuthal angle between the reference marker and the elongated member; determining the angle of inclination between the leveled plane surface and the elongated member; rotating the plane surface 180° and again determining the respective azimuthal angle and angle of inclination; and averaging the two readings for the respective angles to make an accurate determination of borehole orientation.

\* \* \* \* \*